June 21, 1938.　　　　　A. NYMAN　　　　　2,121,550
INDUCTION MOTOR
Filed Feb. 4, 1935
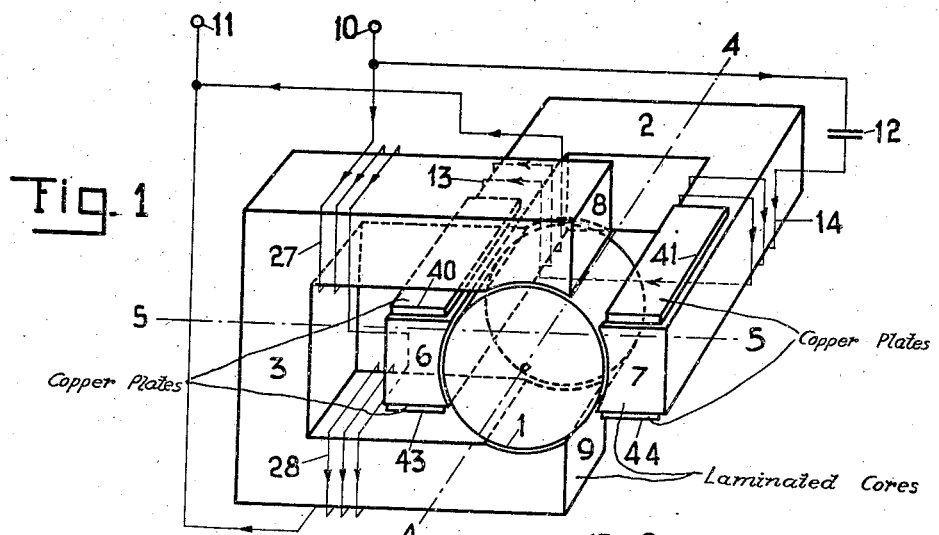
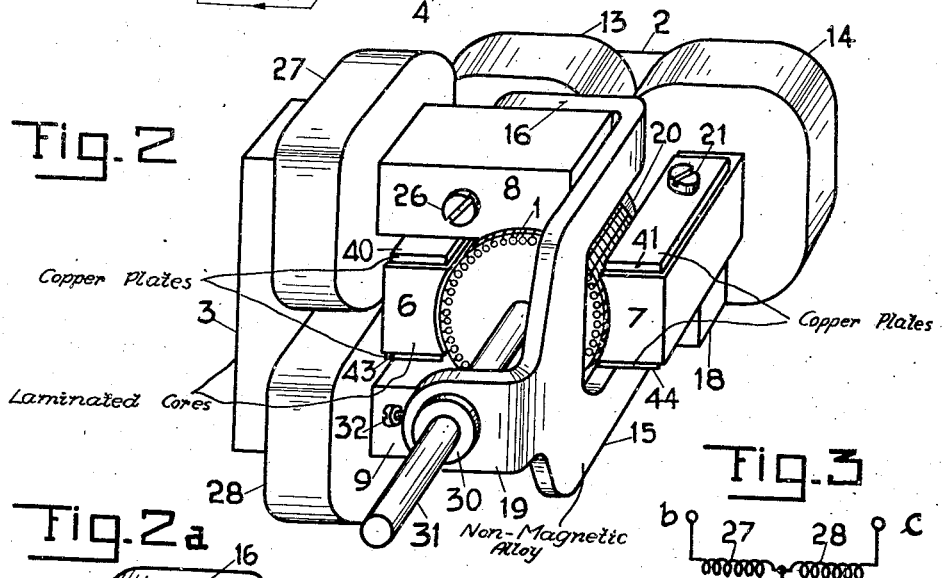
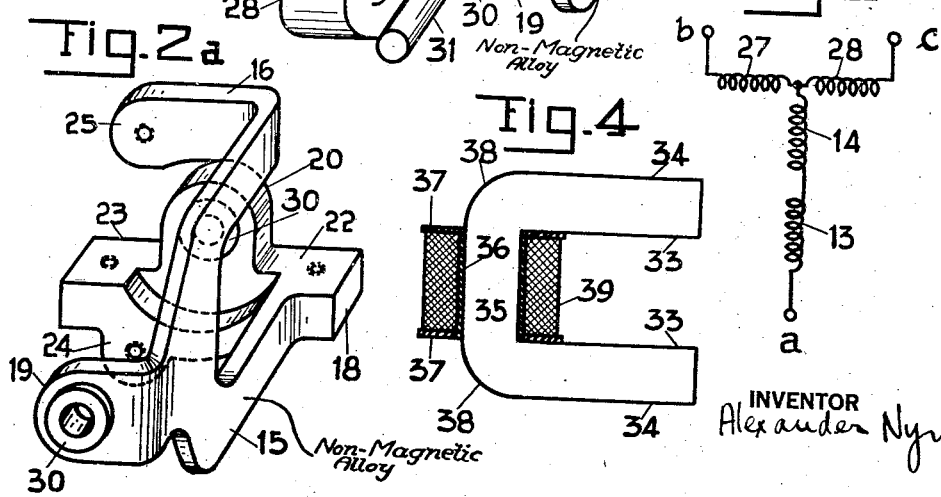
INVENTOR
Alexander Nyman.

Patented June 21, 1938

2,121,550

UNITED STATES PATENT OFFICE 2,121,550

INDUCTION MOTOR

Alexander Nyman, Weehawken, N. J.

Application February 4, 1935, Serial No. 4,821
In Switzerland February 4, 1934

4 Claims. (Cl. 172—278)

This invention relates to alternating current induction motors and has among its objects the provision of an improved small single phase induction motor which has a high starting as well as a high running torque and is efficient in operation.

In the practical exemplification of the invention shown in the drawing, the motor is provided along its circumference with sets of two consecutive poles of one polarity followed by a set of two adjacent poles of opposite polarity, the adjacent poles being designed and excited to produce a substantially constant rotating magnetic field similar to that produced by a motor having polyphase excitation.

The magnet cores which produce the effect of one phase are preferably located parallel to the motor axis, while the magnet cores which produce the effect of the other phase are placed perpendicular to the axis of the motor. By using separate magnet cores, magnetic circuits are excited to produce magnetic fluxes in substantially 90° phase relation. There is also available ample space for the inducing winding, and the magnetic field can be increased to the saturation point of the iron. In this way, a large output at high efficiency is possible in a relatively small motor.

The improved construction permits also the use of the simple cast frame for supporting the cores and the rotor.

The foregoing and other objects of the invention will be best understood from the following description of exemplifications thereof, reference being had to the accompanying drawing wherein Fig. 1 is a diagrammatic view of a single phase motor illustrating the principles of the invention;

Fig. 2 is a perspective view of an assembled single phase motor in accordance with the invention;

Fig. 2a is a perspective view of the frame for supporting the stator and rotor of the motor of Fig. 2;

Fig. 3 illustrates the connections of the motor windings for operation from a three-phase alternating current supply source;

Fig. 4 illustrates a modified form of exciting winding for the motor.

In the motor shown in Figs. 1 and 2, a rotor coil is provided with two separate laminated magnet cores 2 and 3. The axis of the rotor as indicated by the line 4—4 is also the axis of the magnet core 2, while the axis 5—5 of the magnet core 3 is perpendicular to the axis 4—4. The magnet core 2 has poles 6 and 7 with pole faces lying at the opposite sides of the rotor, while magnet core 3 has poles 8 and 9 with pole faces lying between the pole faces 6 and 7 of core 2. Core 2 is excited by coils 13 and 14 mounted on the core legs. The coils 13 and 14 are connected through a condenser 12 to the line terminals of single phase alternating current lines 10 and 11. Core 3 is excited by coils 27 and 28 which are likewise connected to the single phase lines 10 and 11. The arrangement of the coils on the core legs and their mounting on the frame 15 is shown in detail in Figs. 2 and 2a.

The use of separate magnets for each phase permits the design of the magnetic circuit of each magnet core in such a way that the same value of capacity of the condenser 12 gives a large starting torque and a relatively large running torque without the necessity for changing any connection of the winding.

The magnet core 3 has a magnetic leakage path across part 6 of the core of magnet 2 projecting between the ends 8 and 9 of the magnet core 3. Accordingly the coils 13 and 14 on core 2 have a lower leakage inductance than the coils 27 and 28 on core 3. The capacity of the condenser 12 included in the exciting circuit of coils 13 and 14 is so chosen as to give the current flowing through the coils 13 and 14 a phase lead of about ¼ of a cycle as compared to the current through coils 27 and 28.

Accordingly, if at a certain instance, the current flowing through coil 13 of core pole 6 makes its pole face opposite the rotor act as north pole, the pole face of core pole 8 will become a north pole ¼ of a cycle later, the pole 7 will become a north pole ½ of a cycle later, and the pole face of core pole 9 will become a north pole ¾ of a cycle later, and the core face of core pole 6 will again become the north pole a full cycle later. This cyclical process continues and produces a substantially constant magnetic field travelling around the rotor over the pole faces of core poles 6, 7, 8 and 9 corresponding to the usual type of rotating magnetic field. The rotor 1 is provided with a short-circuited squirrel cage winding of the usual type and will accordingly operate with a high starting torque and a high operating torque like a regular polyphase alternating current inductor motor.

In the preferred arrangement as shown in Fig. 1, one magnet pole is excited ¼ of a cycle after the other. The magnet core 3 is excited directly from the alternating current line terminals 10 and 11, while the magnet core 2 is excited through the condenser.

The value of condenser 12 should be such that current through magnet 2 leads the current through magnet 3 by about ¼ cycle. To secure sufficient starting torque, the capacity of condenser 12 should be such that the ¼ phase relation exists during starting and a smaller phase relation during operation, or some intermediate value of capacity may be used. The choice of capacity is determined largely by design factors and the desired starting and operating conditions. I prefer to include the condenser 12 in the circuit of magnet 2 since this latter has, in general, a lower leakage inductance than magnet 3. I may also change the number of turns on magnet 2 depending upon the value of voltage across the coils of this magnet. This voltage may be raised by a condenser to a value above the line voltage depending upon the desired phase relation of the current of this magnet.

Fig. 2 shows the arrangement of the coils and the supporting frame. The magnet 2 has two coils 13 and 14 on the poles 6 and 7, respectively. The frame 15 which may be of some non-magnetic alloy manufactured as a die casting has an arm 16, a foot 18 and projections 19 and 20. The magnet 2 is held by two screws, such as 21, on the foot 18. The foot 18 has for this purpose two holding surfaces 22 and 23 which support, respectively, poles 7 and 6. The arm 16 has a holding surface 25 and the side of the foot 18 has a holding surface 24. These two surfaces fix the positions of the poles 8 and 9 of magnet 3 suitably in place, for instance, by grooves and screws 26. The magnet 3 has two coils 27 and 28. The rotor 1 carries a squirrel cage winding 29 of the usual type, although the rotor may have collector rings or even a commutator and be operated accordingly. The projections 19 and 20 support the bearings, such as 30, for the rotor axis 31. The bearing 30 may be held in place by a screw 32. Such an arrangement permits a single frame for the motor. The two bearings can be machined at exact positions relative to the supporting surfaces 22, 23, 24 and 25. The rotor is inserted without bearing 30 and the latter is then slipped over the axis 31 and fixed in place by screw 32. The magnet surfaces around the rotor may then be carefully machined in position to insure an accurate and small air gap. Even for the construction of Fig. 2, special grinding tools may be designed to grind the pole surfaces mounted in their position on the frame, as shown. In either case, the construction is very simple and inexpensive. The machine work on the frame is reduced to a minimum and an accurate air gap is assured.

The primary leakage field with this type of stator is only 10 to 15% of the operating magnetic field which insures efficient utilization of the magnetic circuit to produce the tractive force. This leakage flux may be further reduced by placing copper plates above and below each side of the magnet 2 as indicated at 40, 41, 43 and 44 of Fig. 1. Such plates, being directly in the path of the leakage flux from magnet 3 across the sides of magnet 2, will have established in them eddy currents which effectively limit the value of such flux. In spite of a concentrated primary winding, the so-called zig-zag leakage field between the primary and secondary windings is only 1.5 to 2.5 times the leakage of one rotor tooth, which is quite permissible in small motors with relatively high value of rotor resistance. It is evident from the construction that there is no limitation on the size of the magnetizing, i. e. primary windings. Thus, the electrical losses in the primary winding, which are so difficult to minimize in the annular stator construction of small size, can be made as small as desired and practically negligible.

The motor described above has two poles, each pole containing two isolated phases, one of which includes an external condenser, the other an internal inductance formed by the relatively large magnetic leakage of the magnet at right angles to the axis. Both phases are supplied from the source of alternating current.

The effect during starting period is to give a phase shift of the order of 100° to 110° in the rotor fields with relative small condenser volt-amperes and a voltage reduction on the condenser phase slightly below the saturation point of its magnetic circuit. With a rotor winding capable of distributing the rotor currents evenly, a large starting torque is obtained.

During operation, there is a reduction of current and a consequent reduction in phase angle of the rotor fields to 70 or 80°. On the other hand, this reduction of current increases the back E. M. F. on the inductive phase. At the same time the condenser phase is brought to such an increased value of back E. M. F. that certain saturation of the magnetic circuit takes place, resulting in an increase of magnetizing current.

The value of magnetic field in the rotor is increased during the operating period and the phase angle is maintained at a sufficiently great value to give a relatively large torque. Thus, a large effective H. P. for the rotor is secured.

An annular stator with distributed windings has no internal means for increasing the inductance of one phase relative to the other. The relatively small available space for stator windings does not permit a magnetizing current of large magnitude. Hence the magnetic field on the rotor must be limited with a consequent limitation of power. An increase of stator slots for greater winding space means a reduction of rotor flux as limited by the saturation of stator teeth. These limitations of an annular stator are entirely absent in the motor of the present invention.

The saturation of rotor teeth is of much lesser importance since the frequency of the rotating field during operation is necessarily quite low, while the stator has the full frequency and the consequent high losses for saturated parts, which are absent in the new motor.

I find that these and other factors contribute to the high efficiency and the large output of this motor even for the smallest sizes. They render such small motors practical and equivalent in size and force to the so-called "universal" motors of commutator type. At the same time they are less expensive to make and have no drawbacks of the latter type, such as large friction, noise and radio interference. The fact that in spite of these defects the "universal" motor has remained the leading type among small motors is attributable mostly to the relatively large size and poor efficiency of induction motors of the existing types. My invention frees the designer from the limitation of established forms, and makes possible the utilization of the inherent advantages of the induction motor. Some of the features of the present invention are applicable to motors operated with polyphase currents.

The structure of Fig. 2 is quite suitable for two phase operation, each magnet being supplied by one of the phases.

This motor can also be operated from a three phase supply by utilizing the principle of "Scott" or T connection. Thus, for instance, referring to Figs. 2 and 3, coils 13 and 14 may be connected in series to one phase "a" and to the central connection between coils 27 and 28. The coils 27 and 28 are also connected in series and their terminals joined to the remaining two phases "b" and "c" of the three phase supply. Of course, the number of turns of different coils should be then chosen to suit the particular voltages appearing at their terminals.

In Fig. 4 is shown a modified form of winding for the motor. Instead of using two coils on each magnet, it is possible to wind one coil directly on the rear portion of the magnet 35.

The invention is not limited to the arrangements explained in connection with the exemplifications described above, and many modifications thereof will suggest themselves to those skilled in the art. It is accordingly desired that the appended claims be given a broad construction commensurate with the scope of the invention.

I claim:

1. A single phase alternating current rotary motor comprising a driving core structure having two magnetically distinct peripherally mounted core members, energizing windings on said core members for producing magnetic fluxes, and a driven core structure having a plurality of winding sections connected to carry currents induced by said driving core structure, one of said driving core members being embraced by the other driving core member and proportioned to constitute a leakage path for the flux induced in said other core member by its energizing windings for producing in said driving core members phase displaced driving fluxes under the action of currents from a single phase source supplied to said energizing windings.

2. A single phase current motor comprising a driving core structure having two magnetically distinct peripherally mounted core members, energizing windings on said core members for producing magnetic fluxes, and a driven core structure having a plurality of winding sections connected to carry currents induced by said driving core structure, one of said driving core members having an axis parallel to the motor axis and a core portion constituting a leakage path for the flux of the other driving core member having an axis perpendicular to the motor axis, said leakage path being proportioned to induce in said driving core members phase displaced driving fluxes under the action of currents from a single phase energizing source supplied to said energizing windings.

3. A single phase current motor comprising a driving core structure having two magnetically distinct peripherally mounted core members, energizing windings on said core members for producing magnetic fluxes, and a driven core structure having a plurality of winding sections connected to carry currents induced by said driving core structure, each of said core members having a plurality of peripherally displaced pole areas of opposite polarity facing said driven core structure, the pole areas of one of said core members being peripherally displaced relatively to the pole areas of the other of said core members and aligned with said other core members for successively subjecting each aligned peripheral portion of the driven core structure to the action of the fluxes of the different core members, one of said core members having core portions constituting leakage paths for the flux induced by currents flowing through the energizing windings of the other core member, and condenser means connected in the circuit of the energizing windings of one of said core members.

4. A single phase current motor comprising a driving core structure having two magnetically distinct peripherally mounted core members, energizing windings on said core members for producing magnetic fluxes, and a driven core structure having a plurality of winding sections connected to carry currents induced by said driving core structure, each of said core members having a plurality of peripherally displaced pole areas of opposite polarity facing said driven core structure, the pole areas of one of said core members being peripherally displaced relatively to the pole areas of the other of said core members and aligned with said other core members for successively subjecting each aligned peripheral portion of the driven core structure to the action of the fluxes of the different core members, one of said core members having core portions constituting leakage paths for the flux induced by currents flowing through the energizing windings of the other core member, and condenser means connected in the circuit of the energizing windings of one of said core members, said leakage paths, said windings and said condenser means being proportioned and correlated to produce under the action of currents from a single phase source substantially 90-electrical degrees displaced magnetic fluxes through successive peripheral pole areas of said driving core structure.

ALEXANDER NYMAN.